Sept. 16, 1941.   H. S. LABOMBARDE   2,255,982
METHOD OF MAKING TAPERED CUPS
Original Filed June 27, 1936    6 Sheets-Sheet 1
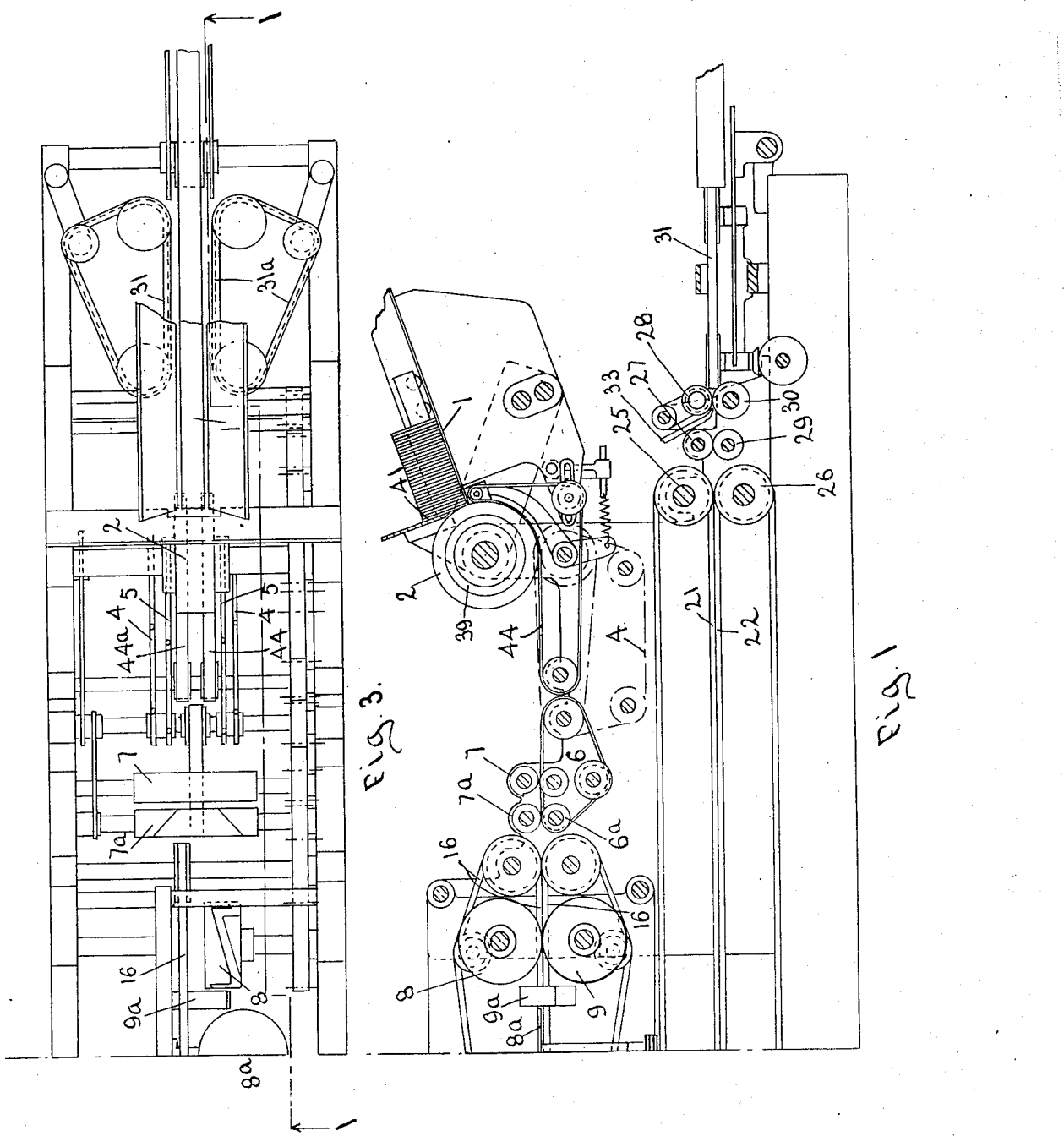
INVENTOR
Harold S. Labombarde
by George A. Rockwell,
Atty Sept. 16, 1941.    H. S. LABOMBARDE    2,255,982
METHOD OF MAKING TAPERED CUPS
Original Filed June 27, 1936    6 Sheets-Sheet 2
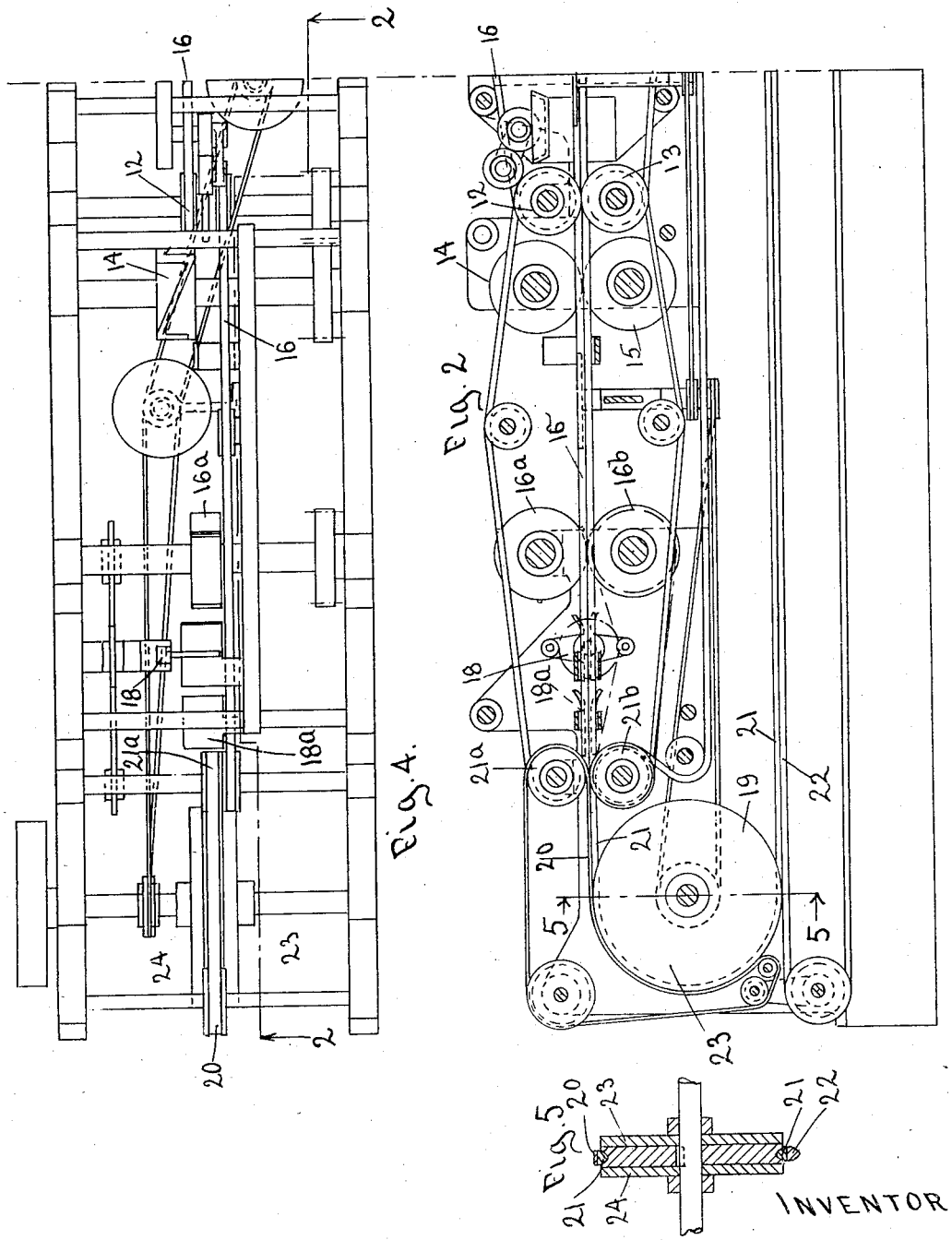
INVENTOR
Harold S. Labombarde
by George A. Rockwell
att'y Sept. 16, 1941.     H. S. LABOMBARDE     2,255,982
METHOD OF MAKING TAPERED CUPS
Original Filed June 27, 1936     6 Sheets-Sheet 3
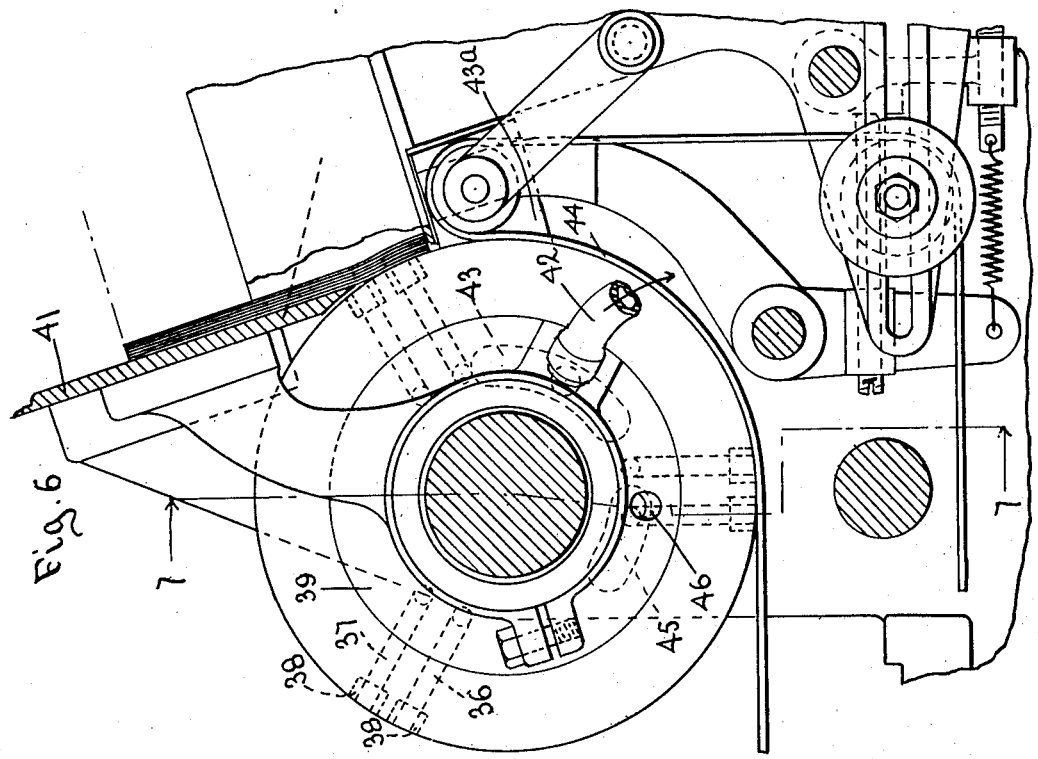
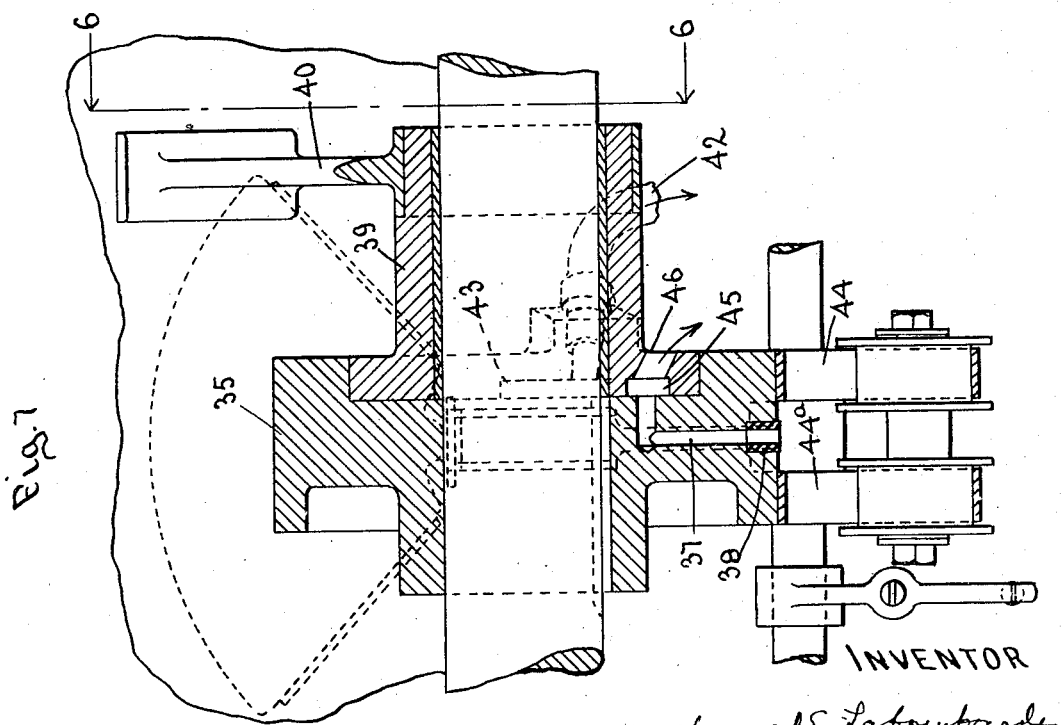
INVENTOR
Harold S. Labombarde
by George A Rockwell
Att'y Sept. 16, 1941.   H. S. LABOMBARDE   2,255,982
METHOD OF MAKING TAPERED CUPS
Original Filed June 27, 1936   6 Sheets-Sheet 4
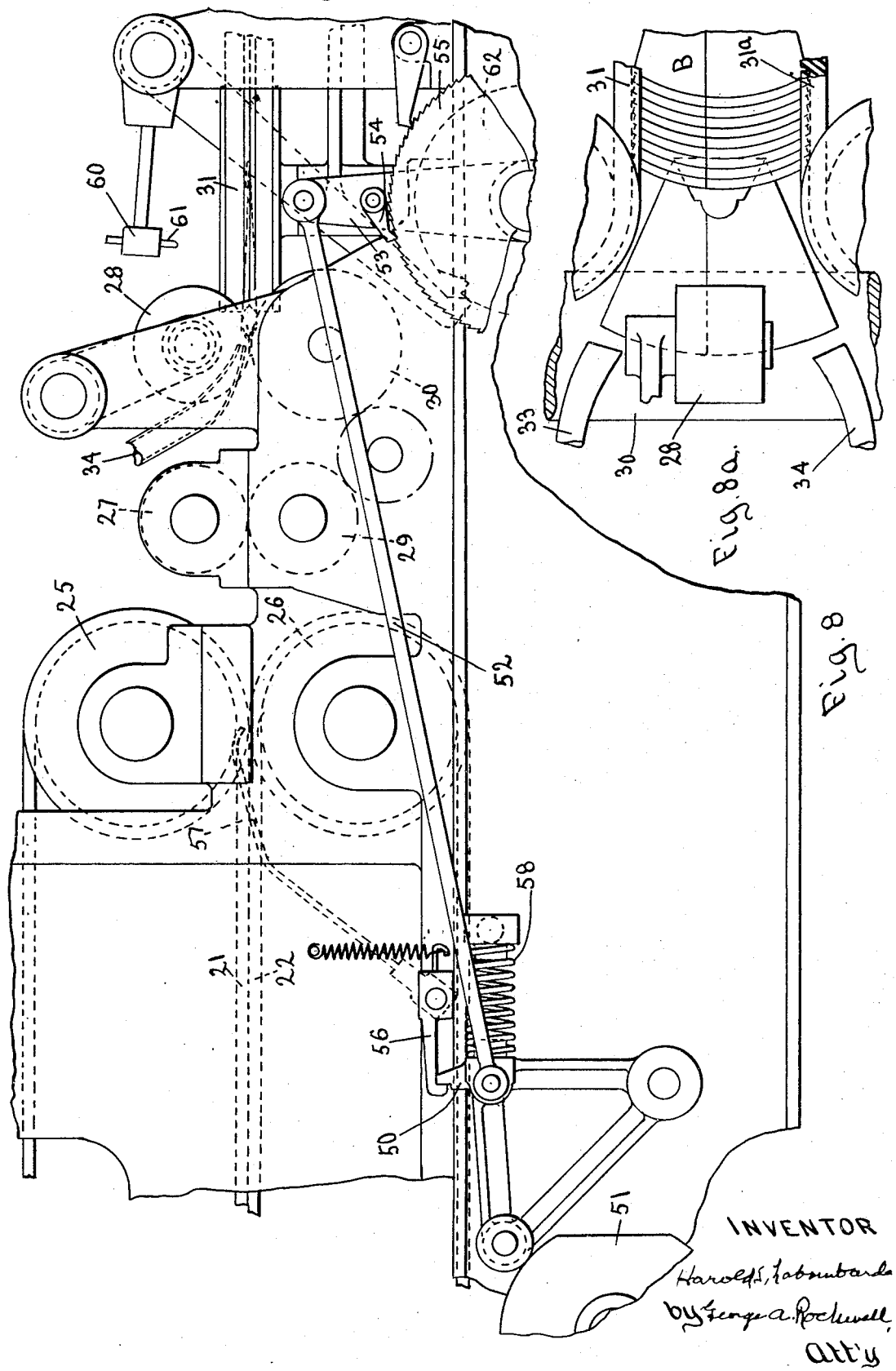
INVENTOR
Harold S. Labombarde
by George A. Rockwell,
att'y Sept. 16, 1941.    H. S. LABOMBARDE    2,255,982
METHOD OF MAKING TAPERED CUPS
Original Filed June 27, 1936    6 Sheets-Sheet 5

INVENTOR
Harold S. Labombarde
by George A. Rockwell
Att'y

Sept. 16, 1941. H. S. LABOMBARDE 2,255,982
METHOD OF MAKING TAPERED CUPS
Original Filed June 27, 1936  6 Sheets-Sheet 6
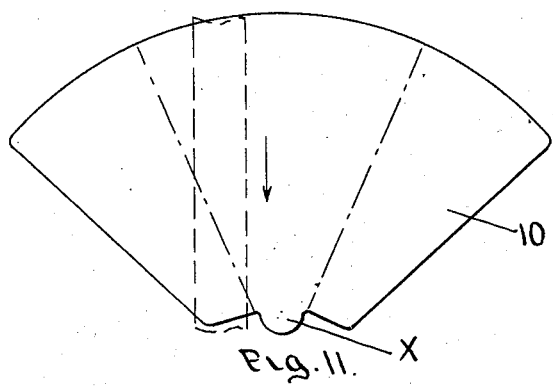
Fig. 11.
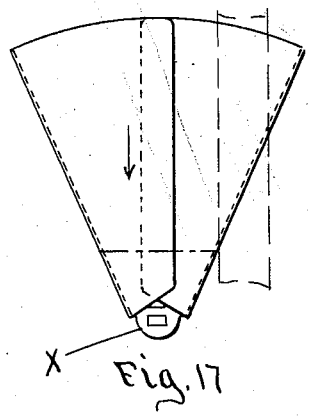
Fig. 17.
Fig. 12.
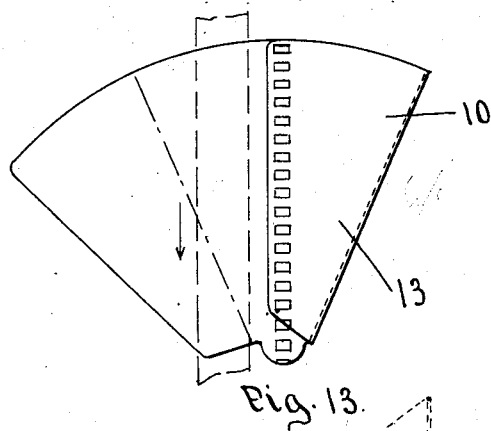
Fig. 13.
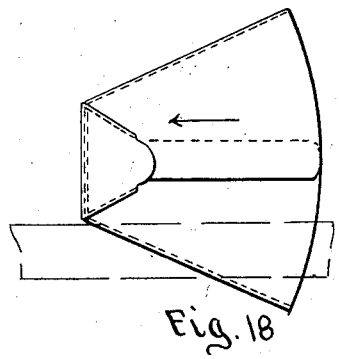
Fig. 18.
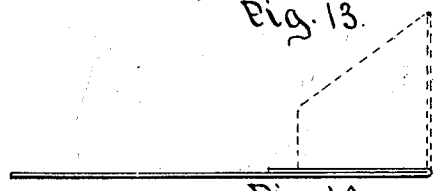
Fig. 14.
Fig. 19.
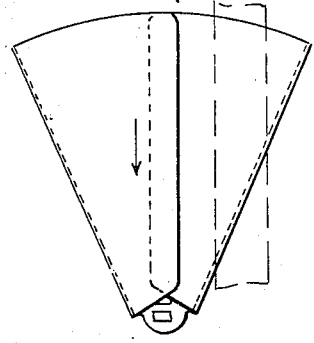
Fig. 15.
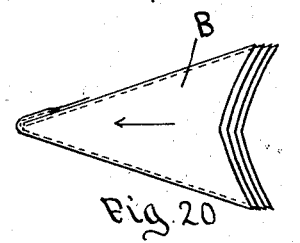
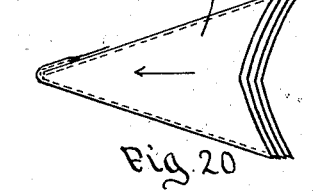
Fig. 20.
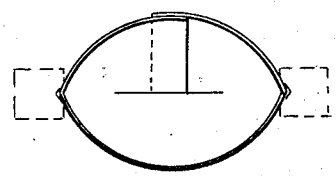
Fig. 21.
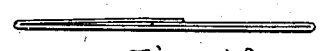
Fig. 16.
INVENTOR
Harold S. Labombarde
by George A. Rockwell
atty Patented Sept. 16, 1941

2,255,982

UNITED STATES PATENT OFFICE 2,255,982

METHOD OF MAKING TAPERED CUPS

Harold S. Labombarde, Nashua, N. H., assignor to Dixie-Vortex Company, Chicago, Ill., a corporation of Delaware Application June 27, 1936, Serial No. 87,628
Renewed April 14, 1939

11 Claims. (Cl. 93—36.05)

The principal object is to provide a machine with greatly increased speed for making tapered cups of paper or similar material, my machine being about six times as fast as any machine heretofore known.

A feature of my invention is that the blanks are formed in flat condition and held under pressure in flat condition until the glue is set sufficiently for distending and nesting. Preferably the forming and drying operations are at continuous rotary high speed. From the time the blanks are put in motion by the feeder until they come to rest in the nesting device they travel preferably at one continuous high speed. All the registering, scoring, folding, gluing and drying operations are rotary as distinguished from plunger, or other reciprocating operations.

Another feature is that the flat cups are mechanically opened coincident with the nesting operation.

Another feature is that all operations of folding, gluing and nesting are performed while the blank, even when formed into a cup, travels forward always at a continuous uniform speed in a straight path.

Other features will be pointed out below.

In the drawings

Figures 1 and 2 are sectional diagrammatic elevations substantially on the line 1—1 of Figure 3 and line 2—2 of Figure 4, respectively;

Figures 3 and 4 are diagrammatic plans of Figures 1 and 2, respectively;

Figure 5 is an end view of the roll for transferring the glued cup;

Figure 6 is a sectional elevation of the combing roll and contiguous parts on line 6—6 of Figure 7;

Figure 7 is a sectional elevation substantially on the line 7—7 of Figure 6;

Figure 8 is an elevation of the feeding mechanism for the glued cups; and Figure 8a is a fragmentary plan showing a cup in the nip of rolls 28 and 30.

Figures 11 and 12 represent a blank showing the scoring for the first and second folds;

Figures 13 and 14 show the blank after passing the first folding roll and after the application of the glue;

Figures 15 and 16 represent the blank after the second fold has been made and passed toward the end scoring roll;

Figure 17 represents the scoring for the end fold;

Figures 18 and 19 show the end folded over as it passes forward to be distended; and Figures 20 and 21 show the distended cups as nested.

The blanks shown in Figure 11 are banked in the hopper 1. Sufficient slope and weight back of this bank with the slope of the hopper brings the forward one against the comb roll 2, as shown in Figure 1. A single blank is picked up and moved around the roll by means which will be described later.

Figure 9:
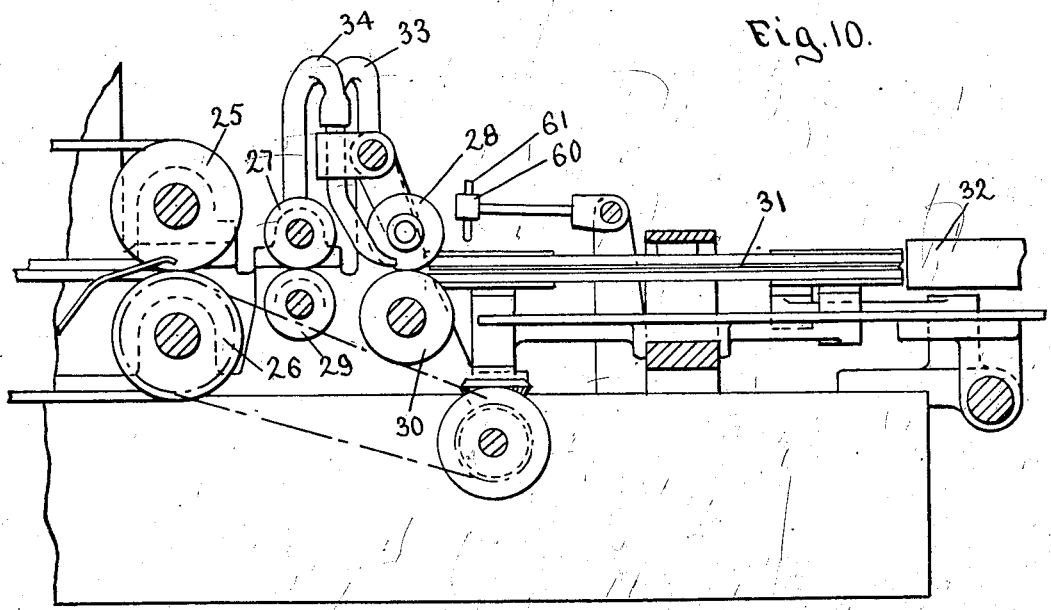
Figure 9 is a sectional elevation on line 9—9 of Figure 10 showing the mechanism for distending the cups.

Three blanks are picked up in each revolution of the roll 2. The belts 44, 44a move these forward against pins fixed to the chains 4 and 5 on either side, which chains are run at a slower speed than the belts 3 and thus the blanks are registered. The blanks pass forward into registering and drive rolls 6 and 7 and then between scoring rolls 6a and 7a where they are scored or creased, as shown in Figure 11, and are delivered between upper and lower carrier belts 16. These carrier belts carry the blanks through the various folding operations until the blanks are in the form shown in Figure 13. The folding mechanism consists of the rolls 8 and 9, the disc 8a and folder plate 9a. The rolls 8 and 9 fold the left flap into vertical position and the disc 8a and folder plate 9a fold the flap 10 into the position of Figure 13. Then the blanks are moved forward, as shown in Figures 2 and 4, passing under the glue roll 12 where glue is applied to the flap that has been folded over, as well as to the end tab X. Roll 13 supports the blanks during the gluing. The rolls 8 and 9 and 14 and 15 are rotary folders, the former folding the left flap and the latter folding the right flap in the same manner. The belts 16 transfer the blank under the first rolls and the movement is transferred at the time of reaching the glue roll to the other side to enable the rolls 14 and 15 to act to fold the other flap. The blank then passes under the end scorers 16a and 16b and the folded blank is scored, as shown in Figure 17. The continuously rotating folding arm 18 swings the leading flap or tab up into vertical position. The blank then enters a chute way 18a which folds the tab from the vertical position down on to the body of the cup. The blanks then move about the roll 19 between the belts 20 and 21. All of the time, from pulleys 21a and 21b clear through to the nesting mechanism, the belts are under tension to keep the glued flaps under pressure and they pass around the roll 19 between the V-belts 21 and 22 in Figure 5, side loose rolls 23 and 24 supporting the blank as it moves around the roll 19 and between the belts 21 and 22. Passing under pressure, as is shown in Figures 1 and 9, the blanks pass between rolls 25 and 26 and thence to feed rolls 27, 28, 29 and 30, the roll 28 being narrow to permit action of the two air blasts referred to below.

Figure 10:
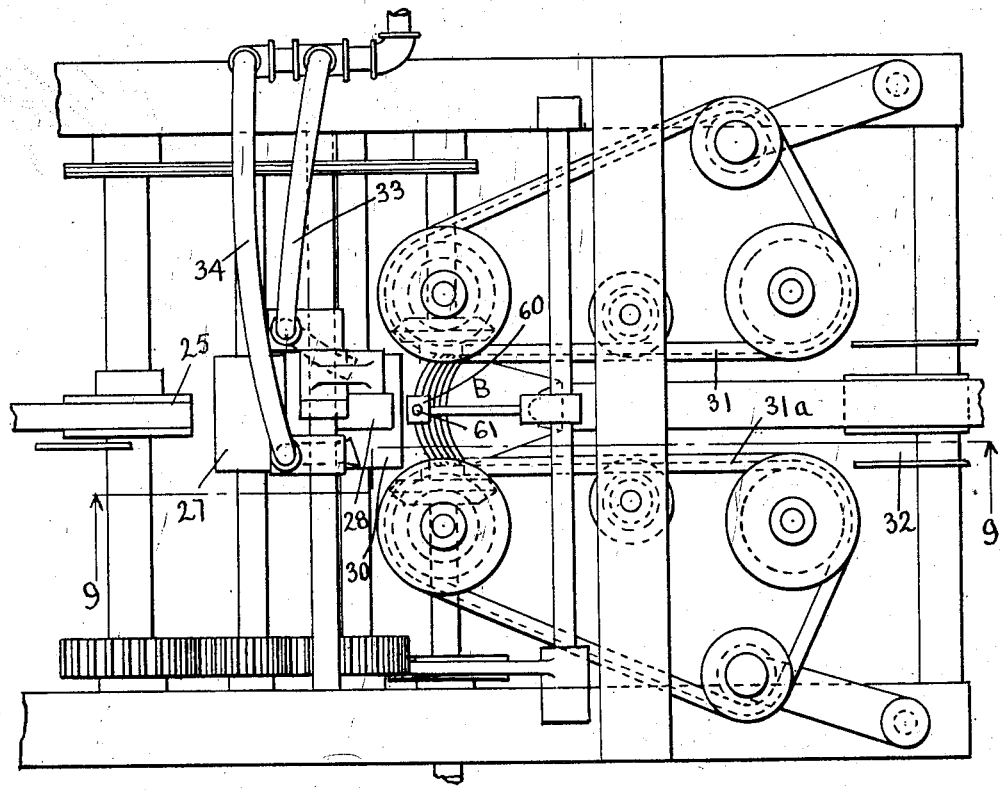
Figure 10 is a plan of the same.

Referring now to Figure 10, the blank passes from between the rolls 28 and 30 into the travelling belts 31 and 31ª which are grooved and spaced to give the desired distention or opening to the glued blank. Air pressure acts through conduits 33 and 34 to distend the blank which passes from the conveyors 31 and 31ª into the receptacle or runway 32.

Referring now to Figures 6 and 7, the combing roll 35 is provided with the passages 36 and 37 in triplicate. At the periphery of the roll rubber plugs 38 are inserted and the passages 36 and 37 connect with depressions or chambers in the member 39 rigidly supported by means of the bracket 40 to the front of the hopper 41. Connecting with these passages is a suction pipe 42 and as the plugs 38 reach the proper position for action on one of the blanks in the hopper, they connect with the chambers 43 and the suction draws the adjacent blank between the belt 44 and the periphery of the roll, spring actuated friction gauge 43ª, located between belts 44 and 44ª, acting to allow the feeding of only one blank at a time from hopper 41. As the passages 38 reach the flat point of the belt a second chamber 45 connected with the outer air permits air to break the suction through the inlet 46 and the blank is then carried forward, as has been explained.

Referring to Figure 8, the feed movement for moving the distended cups is actuated by means of bell crank 50 operating on the cam 51 through the pitman 52 to the lever 53, on which is a pawl 54 engaging the ratchet 55. As the cam 51 revolves it operates to move the ratchet 55 one tooth. The pawl 56, to which is connected the finger 57, operates to catch the end of the bell crank 50 in case no blank is passing over the finger 57. The operation of the feed is by means of the spring 58 acting in reverse.

The counter 60 comprises a lever in the end of which is inserted a lead pencil 61. This lever is actuated from a cam 62 to operate on a predetermined plurality of cups as they pass to be distended, the pencil marking the desired cup while it is being distended, the air forcing a portion of the cup against the pencil.

In Figure 8ª a folded and glued cup in flat form is shown entering the nest B, the most rearward portion of the cup being held in the nip of narrow rubber roll 28 and lower roll 30. The air conduits 33 and 34 force air within the rear of the cup at the portions not in said nip. This results in a preliminary opening of the cup sides while the front end of the cup is entering the nest. When the cup leaves said nip control the distending action is continued by the air, which acts not only to completely distend or open the cup but also to force the cup into fully nested position and in engagement with belts 31 and 31ª.

An important advantage of my initial feeding mechanism is that the friction gauge 43ª maintains a uniform resistance to the blanks being fed regardless of wear on the gauge so that uniform one-by-one feeding is maintained for a long period of time.

I prefer to have the area of that part of the gauge which engages a blank greater than the entire area of the friction plug to prevent rapid wear of the gauge, which wear occurs if the gauge is at any time supported by the friction plug which wear would make the active surfaces of the friction plug and gauge inoperative.

What I claim is:

1. The method of making tapered cups consisting in forming blanks into folded and glued tapered cups complete in flat form; then forcefully partially opening the complete flat cups; and then completing the opening and, coincidentally with said complete opening, nesting the cups while moving each blank continuously along a predetermined path.

2. The method of making tapered cups consisting in forming blanks into folded and glued tapered cups complete in flat form; and then conducting air under pressure into the flat cups to forcefully open the cups and also to forcefully move the cups into nested position.

3. The method of making tapered cups, including forming blanks successively into folded and glued tapered cups while moving each blank continuously along a predetermined path, and applying a motive gas to each cup to expand the same from its flat state and move it forward into nested relationship with previously formed cups.

4. The method of making tapered cups with an upturned end to provide a closure from a substantially quadrantal blank, including forming blanks successively into folded and glued tapered cups complete in flat form with creased side edges, and then applying a motive gas to the open end of each cup to forcefully expand the cup and drive it into nested relationship with previously formed cups.

5. The method of making a tapered cup, including forming a blank of stock into a folded and glued tapered cup complete in flat form, applying a motive gas to the open end of the cup to initially expand the cup, and subjecting the side edges of the cup to compression to further expand the cup.

6. The method of making a tapered cup, including forming a blank of stock into a folded and glued tapered cup complete in flat form with creased side edges, applying a motive gas to the open end of the cup to initially expand the cup, subjecting the side edges of the cup to compression to further expand the cup, and moving the cup while under such compression into nested relationship with previously formed cups.

7. The method of making a container including moving a blank of stock continuously along a predetermined path, folding over a portion of the blank upon the remainder, applying adhesive to the folded part, folding over another part of the blank on the first folded part, turning up an end portion of the blank to close that end, compressing the thus formed container to set the adhesive, applying a motive gas to the open end of the container to expand it, and nesting the container in previously formed containers with the aid of said motive gas.

8. The method of making a flat tapered cup having an upturned bottom closure from a substantially sector-shaped blank, including folding a side portion of the blank over the adjacent part, applying a single stripe of adhesive extending along the margin of the folded part and on the end portion to be upturned, folding over the other side part on said adhesive, turning up the end portion and sealing it to the body part of the thus formed container, and applying a motive gas to the open end of said container to expand the container.

9. The method of making a paper cup, including continuously moving a blank of stock along a predetermined path, initially gripping and driving the blank adjacent one side thereof while forming the other side, then transferring the grip and drive to the formed side and forming the remaining side.

10. The method of forming a wedge-shaped cup with an upturned end portion from a single blank of paper resembling in shape a segment of a circle which consists in moving the blank along a given path and at one station folding one side portion directly over and on the main body of the blank to form substantially one-half of the cup, gluing both the margin of the folded side portion and the end portion to be upturned in a single operation, then at a succeeding station folding the other side portion of the blank directly over and on said main body of the blank in overlapped relation with said first side portion of the blank to form substantially the other half of the cup, subsequently pressing said overlapped side portions to cement them together, thereafter at a next station turning the end of the blank upwardly on and over the lower part of said overlapped side portions, next pressing said turned end to cement it to said part, and adjacent the discharge end of said path forcefully opening the formed cup to enable it to be disposed in nested relation with other similarly formed cups.

11. The method of making a tapered paper cup, including the steps of moving a blank of stock along a predetermined path, successively folding over side flap portions of the blank diretly upon the central body part of the blank and creasing them in position, turning up an end closure over the body and folded side flaps, securing overlapped marginal portions together to provide a central seam, gripping said blank over said central seam, applying a motive gas to the open end of the blank to expand it on both sides of the gripped seam, and releasing the grip on the seam permitting the motive gas to further expand the open end of the cup and force it into nested relationship with previously formed cups.

HAROLD S. LABOMBARDE.